US010292494B1

(12) United States Patent
Huang et al.

(10) Patent No.: US 10,292,494 B1
(45) Date of Patent: May 21, 2019

(54) SLIDE RAIL SELF-RETURN MECHANISM

(71) Applicant: Nan Juen International Co., Ltd., New Taipei (TW)

(72) Inventors: Kuo-Sheng Huang, New Taipei (TW); Li-Ping Wang, New Taipei (TW)

(73) Assignee: Nan Jeun International Co., Ltd., New Taipei (TW)

( * ) Notice: Subject to any disclaimer, the term of this patent is extended or adjusted under 35 U.S.C. 154(b) by 0 days.

(21) Appl. No.: 15/640,807

(22) Filed: Jul. 3, 2017

(51) Int. Cl.
*A47B 88/467* (2017.01)
*F16C 29/02* (2006.01)
*E05F 3/00* (2006.01)
*E05F 3/02* (2006.01)
*E05F 3/10* (2006.01)

(52) U.S. Cl.
CPC .............. *A47B 88/467* (2017.01); *E05F 3/00* (2013.01); *F16C 29/02* (2013.01); *A47B 2088/4675* (2017.01); *E05F 3/02* (2013.01); *E05F 3/10* (2013.01); *E05Y 2900/20* (2013.01); *F16C 2314/72* (2013.01); *Y10T 16/27* (2015.01)

(58) Field of Classification Search
CPC ......... Y10T 16/49; Y10T 16/82; Y10T 16/85; Y10T 16/72; Y10T 16/66; Y10T 16/84; Y10T 16/27; Y10T 16/61; Y10T 16/625; Y10T 16/593; Y10T 16/281; Y10T 16/62; A47B 88/467; A47B 2088/4675; E05F 3/00; E05F 3/02; E05F 3/10; E05F 1/16; E05F 5/003; E05F 5/10; E05Y 2900/20; F16C 29/02; F16C 2314/72

USPC ............... 16/49, 82, 85, 72, 66, 84; 312/333
See application file for complete search history.

(56) References Cited

U.S. PATENT DOCUMENTS

| 7,244,005 | B1* | 7/2007 | Lu ........................ | A47B 88/467 312/319.1 |
|---|---|---|---|---|
| 8,511,764 | B1* | 8/2013 | Chen .................... | A47B 88/467 312/319.1 |
| 8,671,520 | B2* | 3/2014 | Tanno ...................... | E05F 1/16 16/49 |
| 8,726,574 | B2* | 5/2014 | Iwaki ....................... | E05F 1/16 16/49 |
| 8,931,138 | B2* | 1/2015 | Shimizu ................... | E05F 1/16 16/49 |
| 9,648,952 | B2* | 5/2017 | Nuckolls .............. | A47B 88/463 |
| 9,759,002 | B2* | 9/2017 | Muller ..................... | E05F 3/10 |
| 9,877,582 | B2* | 1/2018 | Zhu ........................ | A47B 88/49 |
| 2007/0101539 | A1* | 5/2007 | Sutterlutti .......... | A47B 88/0414 16/49 |
| 2008/0100190 | A1* | 5/2008 | Yang ...................... | A47B 88/40 312/333 |
| 2009/0033187 | A1* | 2/2009 | Chung ................. | A47B 88/467 312/319.1 |
| 2009/0140621 | A1* | 6/2009 | Yang .................... | A47B 88/467 312/319.1 |

(Continued)

*Primary Examiner* — William L Miller (57) ABSTRACT

A slide rail self-return mechanism includes a holder base including a base block, a guide plate extended from the base block, a sliding groove defined in the guide plate and abutted to the base block and a mounting groove defined in the guide plate remote from the base block and disposed in communication with the sliding groove, a sliding seat slidably coupled to the holder base, and a biasing member including a body pivotally connected to the sliding seat and a position-limiting block located at the body and movable through the mounting groove into the sliding groove when the sliding seat is coupled to the holder base.

4 Claims, 9 Drawing Sheets

(56) References Cited

U.S. PATENT DOCUMENTS

| | | | |
|---|---|---|---|
| 2010/0164340 A1* | 7/2010 | Juan | A47B 88/467 312/333 |
| 2011/0001410 A1* | 1/2011 | Chen | E05D 15/582 312/322 |
| 2011/0001412 A1* | 1/2011 | Zimmermann | A47B 88/467 312/334.12 |
| 2011/0041284 A1* | 2/2011 | Kimura | E05F 1/16 16/49 |
| 2011/0043087 A1* | 2/2011 | Shih | A47B 88/467 312/334.1 |
| 2011/0101839 A1* | 5/2011 | Boks | A47B 88/467 312/333 |
| 2011/0175508 A1* | 7/2011 | Rechberg | E05F 3/108 312/334.8 |
| 2012/0063710 A1* | 3/2012 | Park | A47B 88/467 384/26 |
| 2012/0144622 A1* | 6/2012 | Juan | A47B 88/467 16/51 |
| 2013/0014343 A1* | 1/2013 | Tanno | E05F 1/16 16/49 |
| 2013/0133157 A1* | 5/2013 | Kimura | E05F 3/00 16/49 |
| 2013/0219657 A1* | 8/2013 | Iwaki | E05F 1/16 16/64 |
| 2015/0091427 A1* | 4/2015 | Haemmerle | A47B 88/04 312/333 |

\* cited by examiner

SLIDE RAIL SELF-RETURN MECHANISM

BACKGROUND OF THE INVENTION

1. Field of the Invention

The present invention relates to sliding rail technology and more particularly to a slide rail self-return mechanism consisting of a holder base, a sliding seat and a biasing member, which facilitates automated production.

2. Description of the Related Art

Figure 1:
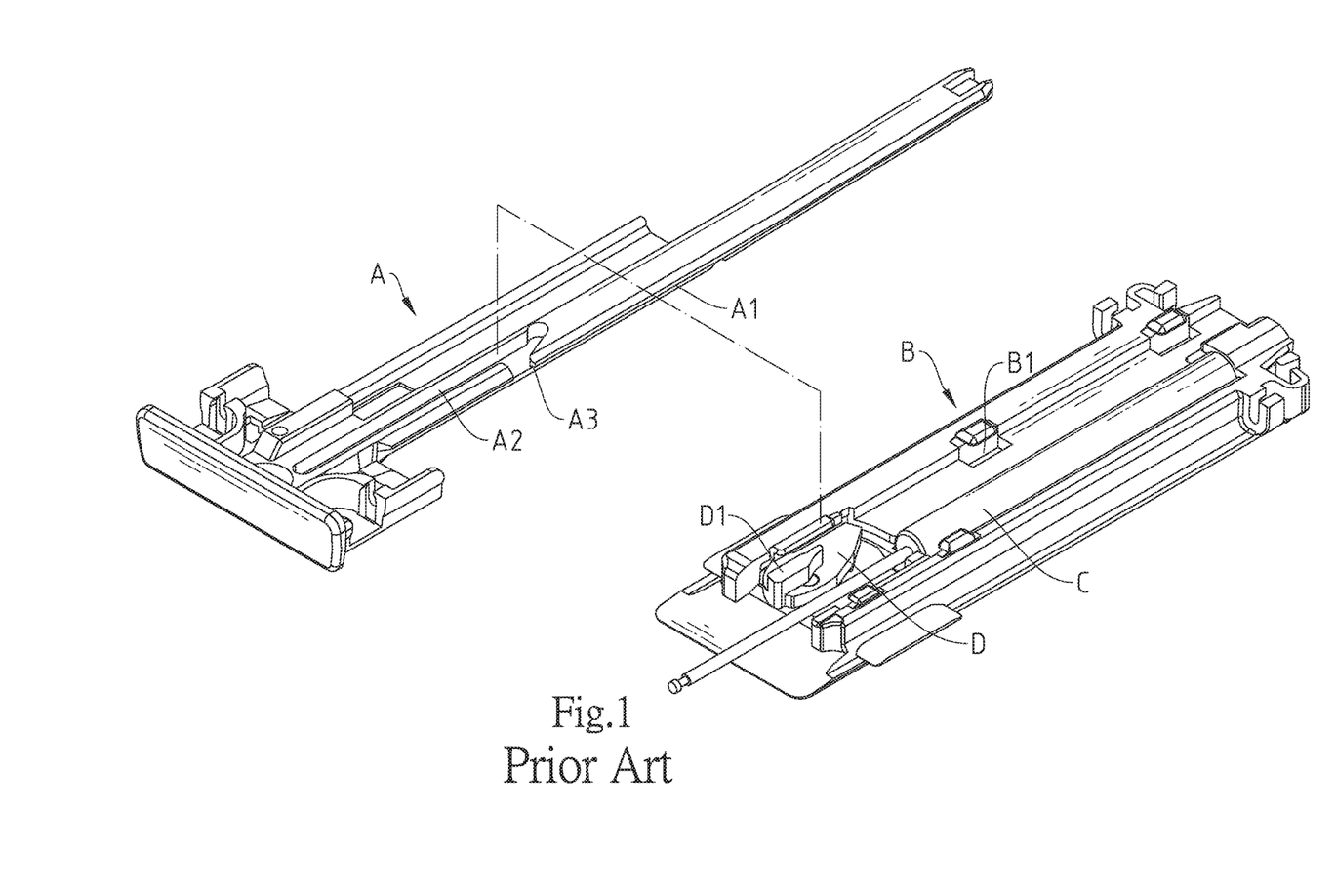
FIG. 1 is an oblique top elevational view of a slide rail self-return mechanism according to the prior art.

Referring to FIG. 1, a conventional slide rail self-return mechanism is known comprising a holder base A, a sliding seat B and a buffer device C connected between the holder base A and the sliding seat B. The holder base A comprises two sliding rails A1 disposed at two opposite lateral sides. The sliding seat B comprises two displacement grooves B1 respectively coupled with the sliding rails A1. Thus, the sliding seat B can be moved forward and backward along the holder base A to act upon the buffer device C. Since the slide rail self-return mechanism needs to provide a position-limiting effect to the slide rail assembly, a biasing member D is pivotally mounted in the sliding seat B. The biasing member D comprises a position-limiting block D1. Further, the holder base A comprises therein a sliding groove A2 for the sliding of the position-limiting block D1, and a notch A3 located in one lateral side of the sliding groove A2 for allowing biasing of the position-limiting block D1. However, since the sliding groove A2 is provided for the sliding of the position-limiting block D1 and for limiting the sliding movement of the sliding seat B, the mounting between the holder base A and the sliding seat B is limited to a vertical direction. In installation, one sliding rails A1 of the holder base A is obliquely inserted into one respective displacement groove B1 of the sliding seat B, and then the other sliding rails A1 of the holder base A is allowed to be inserted into the respective displacement groove B1 of the sliding seat B, allowing the position-limiting block D1 to be coupled to the sliding groove A2. The assembly process of this design of slide rail self-return mechanism is achieved through multiple directions and angles, complicating the installation. Thus, this assembly process cannot be achieved using an automated equipment. Further, the buffer device C needs to be connected between the holder base A and the sliding seat B. In installation, the buffer device C must be obliquely inserted in between the holder base A and the sliding seat B only after the holder base A and the sliding seat B are assembled. Thus, the assembly process of this design of slide rail self-return mechanism is complicated.

SUMMARY OF THE INVENTION

The present invention has been accomplished under the circumstances in view. It is therefore the main object of the present invention to provide a slide rail self-return mechanism, which defines a sliding groove and a mounting groove in a holder base in communication with each other so that when a sliding seat is coupled to the holder base, a position-limiting block of a biasing member that is pivotally connected to the sliding seat is movable through the mounting groove into the sliding groove, simplifying the assembling process between the holder base and the sliding seat and facilitating fabrication of the component parts by an automated fabrication equipment.

It is another object of the present invention to provide a slide rail self-return mechanism, which provides a buffer device in an accommodation chamber of the sliding seat before connection between the sliding seat and the holder base so that when connecting the sliding seat to the holder base, the sliding seat is simultaneously connected to the buffer device, simplifying the installation.

To achieve these and other objects of the present invention, a slide rail self-return mechanism comprises a holder base, a sliding seat and a biasing member. The holder base comprises a base block, a guide plate extended from one side of the base block, two sliding rails longitudinally extended along two opposite lateral sides of the guide plate, a sliding groove longitudinally defined in the guide plate and abutted to the base block, a mounting groove longitudinally forwardly extended from a front end of the sliding groove remote from the base block and disposed in communication with the sliding groove, an insertion hole located on a front end of the guide plate in communication with a front end of the mounting groove opposite to the sliding groove, and a stop block disposed between the sliding groove and the mounting groove and defining a front sloping guide surface that slopes downwardly forwardly into the mounting groove and a rear stop surface that is abutted to the front end of the sliding groove. The sliding seat comprises two sliding rails respectively disposed at two opposite lateral sides thereof in a parallel manner, an accommodation chamber defined therein between the two sliding rails of the sliding seat, and two displacement grooves respectively defining in the sliding rails of the sliding seat to face toward the accommodation chamber and respectively coupled with the sliding rails of the holder base for allowing the sliding seat to slide on the holder base. The biasing member comprises a body pivotally mounted in the accommodation chamber of the sliding seat, and a position-limiting block located at the body and mounted in the sliding groove of the holder base.

When assembling the sliding seat and the holder base, move the holder base and the sliding seat toward each other to connect the displacement grooves to the respective sliding rails of the holder base. At the same time, the position-limiting block is inserted through the insertion hole into the mounting groove and then moved over the stop block into the sliding groove. Thus, the holder base and sliding seat can easily be assembled in one single direction.

Preferably, the slide rail self-return mechanism further comprises a buffer device accommodated in the accommodation chamber of the sliding seat. The buffer device comprises a cylinder body accommodated in the accommodation chamber of the sliding seat between the two sliding rails of the sliding seat, and a reciprocating rod connected to two locating plates at the holder base and movable in and out of the cylinder body.

DETAILED DESCRIPTION OF THE PREFERRED EMBODIMENT

Figure 2:
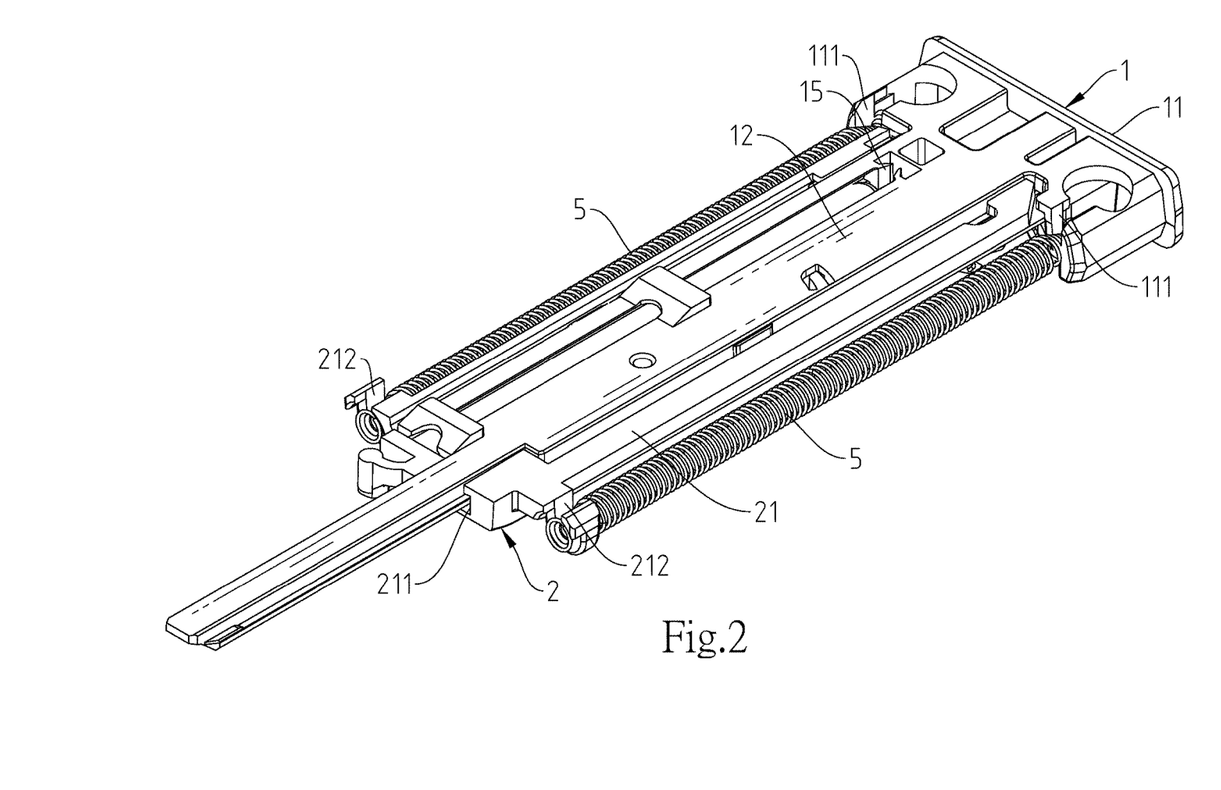
FIG. 2 is an oblique top elevational view of a slide rail self-return mechanism in accordance with the present invention.
Figure 3:
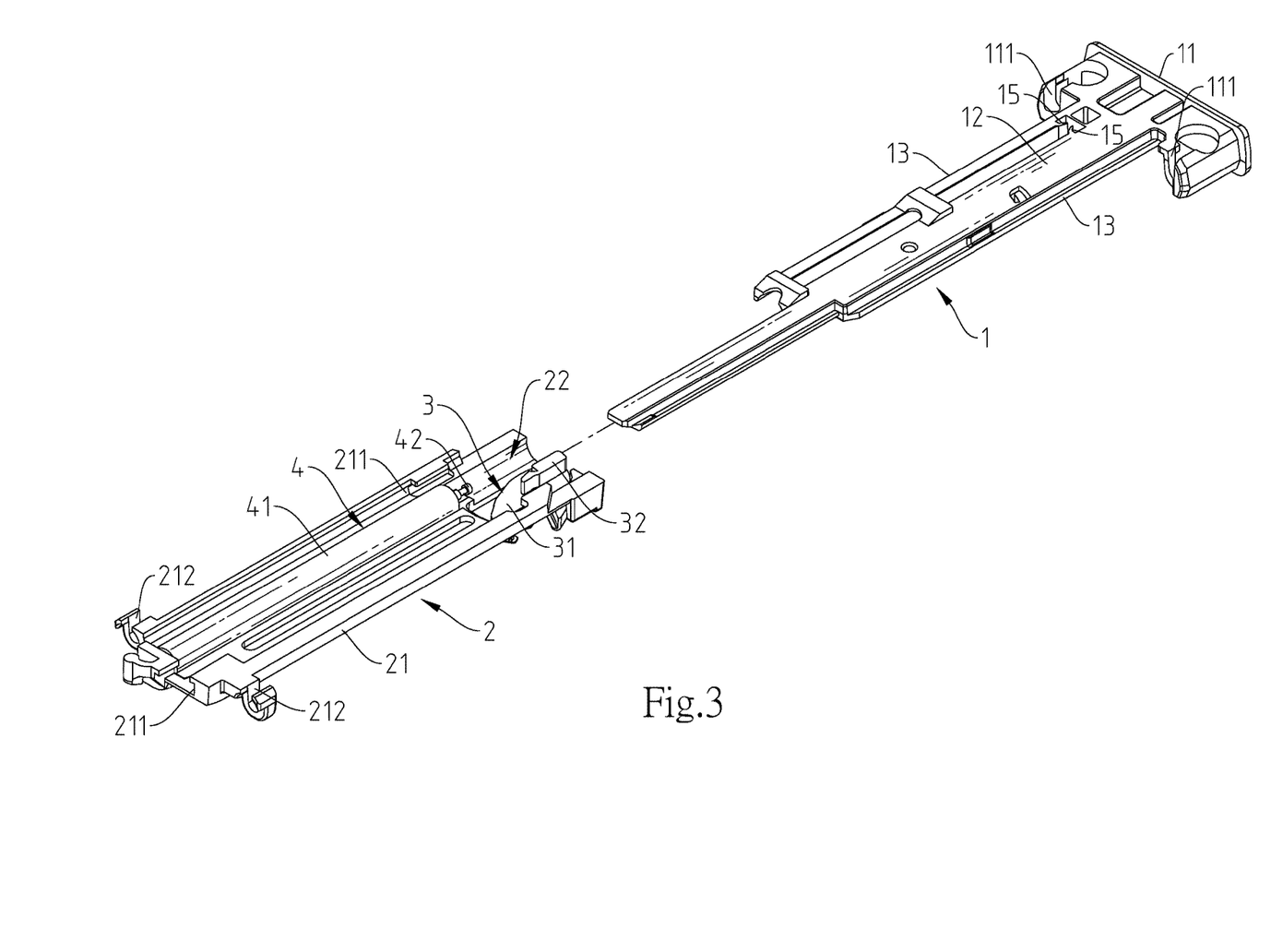
FIG. 3 is an exploded view of the slide rail self-return mechanism in accordance with the present invention.

Referring to FIGS. 1-3, a slide rail self-return mechanism in accordance with the present invention is shown. The slide rail self-return mechanism comprises a holder base 1, a sliding seat 2, a biasing member 3 and a buffer device 4.

Figure 4:
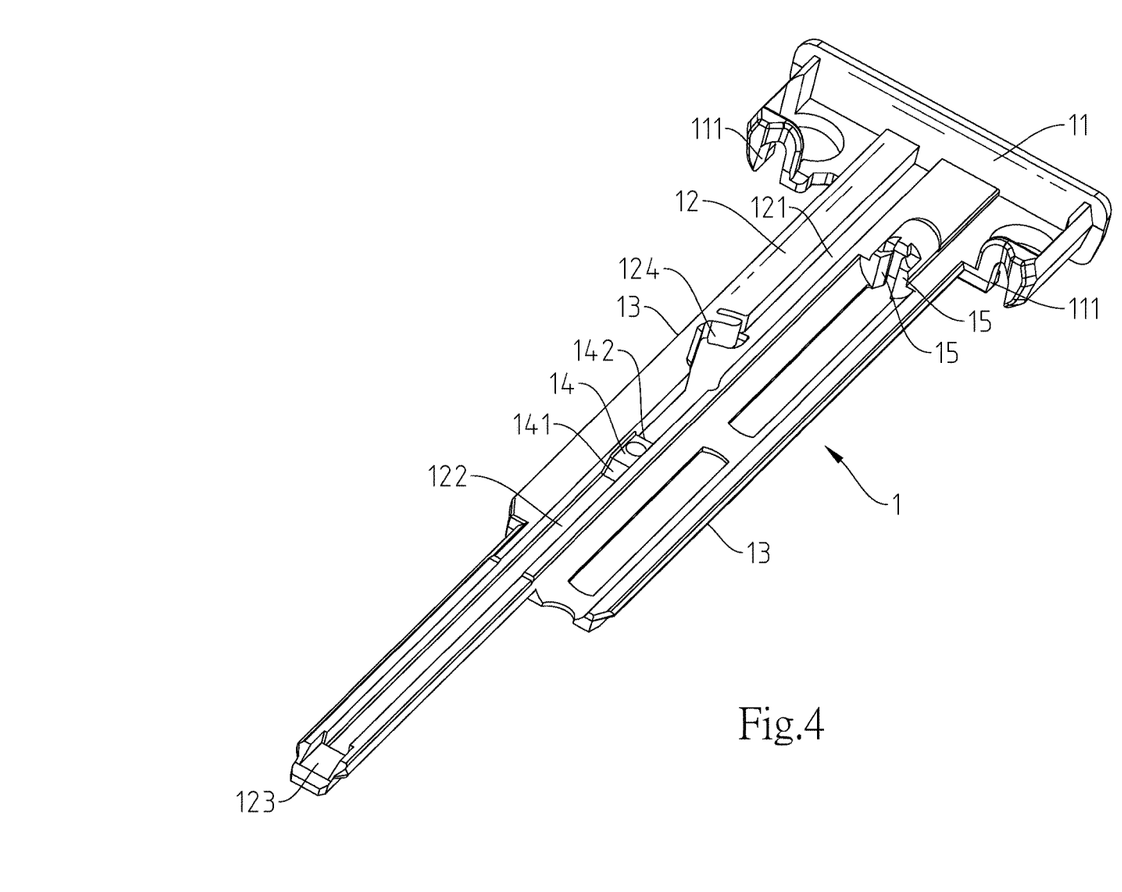
FIG. 4 is an oblique top elevational view of the holder base of the slide rail self-return mechanism in accordance with the present invention.

The holder base 1 comprises a base block 11, a guide plate 12 extended from one side of the base block 11, two sliding rails 13 longitudinally extended along two opposite lateral sides of the guide plate 12, a sliding groove 121 longitudinally defined in the guide plate 12 and abutted to the base block 11, a mounting groove 122 longitudinally forwardly extended from a front end of the sliding groove 121 remote from the base block 11 and disposed in communication with the sliding groove 121, a notch 124 located in one side wall of the sliding groove 121, an insertion hole 123 located on a front end of the guide plate 12 in communication with a front end of the mounting groove 122 opposite to the sliding groove 121, a stop block 14 disposed between the sliding groove 121 and the mounting groove 122 and defining a front sloping guide surface 141 that slopes downwardly forwardly into the mounting groove 122 and a rear stop surface 142 that is abutted to the front end of the sliding groove 121, and two locating plates 15 located on the guide plate 12 in a parallel manner at one lateral sides relative to the sliding groove 121.

Figure 5:
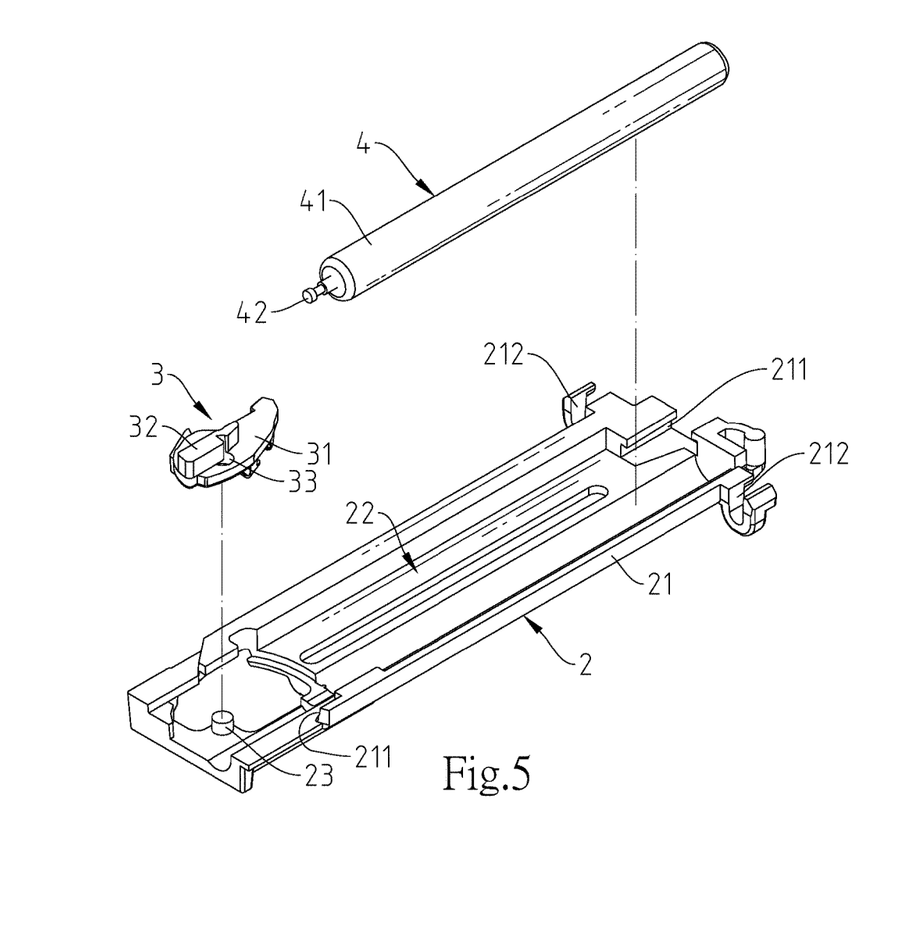
FIG. 5 is an exploded view of a part of the present invention, illustrating the relationship between the sliding seat, the biasing member and the buffer device.

The sliding seat 2 comprises two sliding rails 21 respectively disposed at two opposite lateral sides thereof in a parallel manner, an accommodation chamber 22 defined therein between the two sliding rails 21, two displacement grooves 211 respectively defining in the sliding rails 21 to face toward the accommodation chamber 22, and a pivot pin 23 located in the accommodation chamber 22

The biasing member 3 comprises a body 31, a position-limiting block 32 located at the body 31, and a pivot hole 33 located in the body 31 and pivotally coupled to the pivot pin 23 of the sliding seat 2 for allowing the biasing member 3 to be disposed in the accommodation chamber 22 of the sliding seat 2.

The buffer device 4 can be a hydraulic cylinder or pneumatic cylinder, comprising a cylinder body 41 and a reciprocating rod 42. The cylinder body 41 is accommodated in the accommodation chamber 22 of the sliding seat 2 between the two sliding rails 21.

Figure 6:
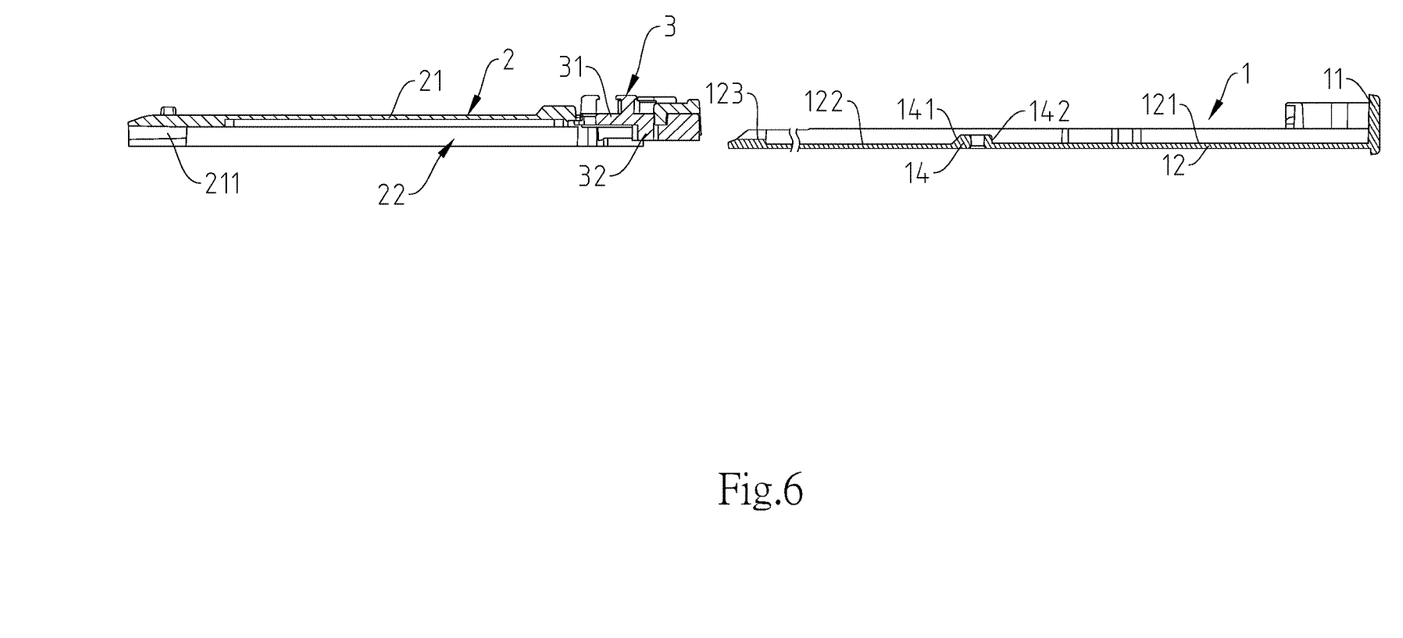
FIG. 6 is a schematic sectional side view of the present invention before connection between the holder base and the sliding seat.
Figure 7:
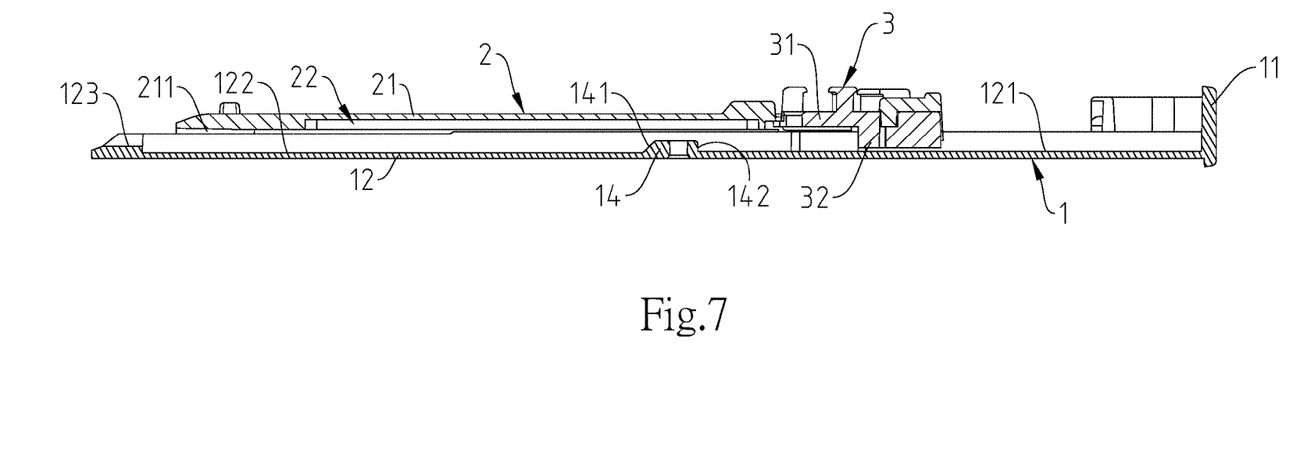
FIG. 7 corresponds to FIG. 6, illustrating the holder base and the sliding seat assembled.
Figure 8:
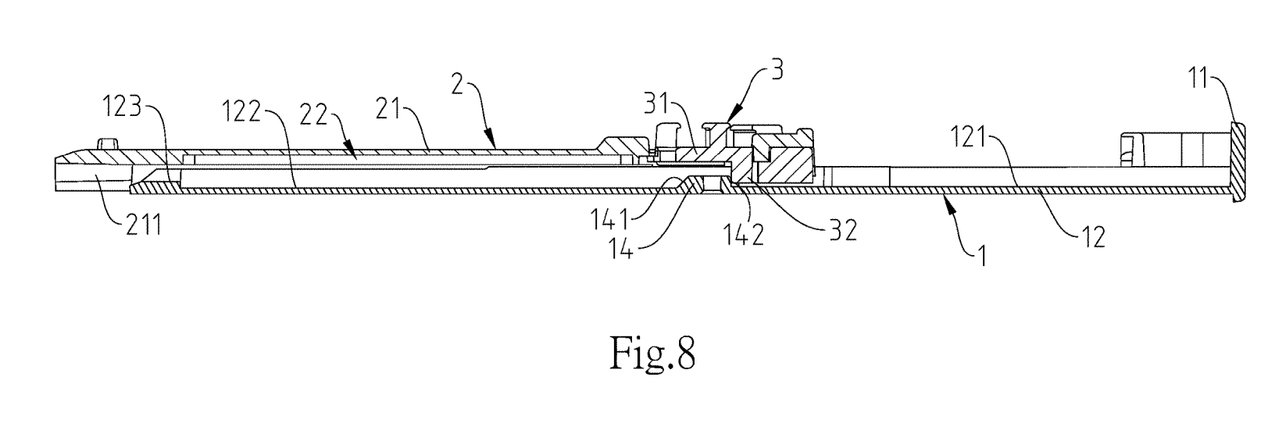
FIG. 8 corresponds to FIG. 7, illustrating the sliding seat moved relative to the holder base.
Figure 9:
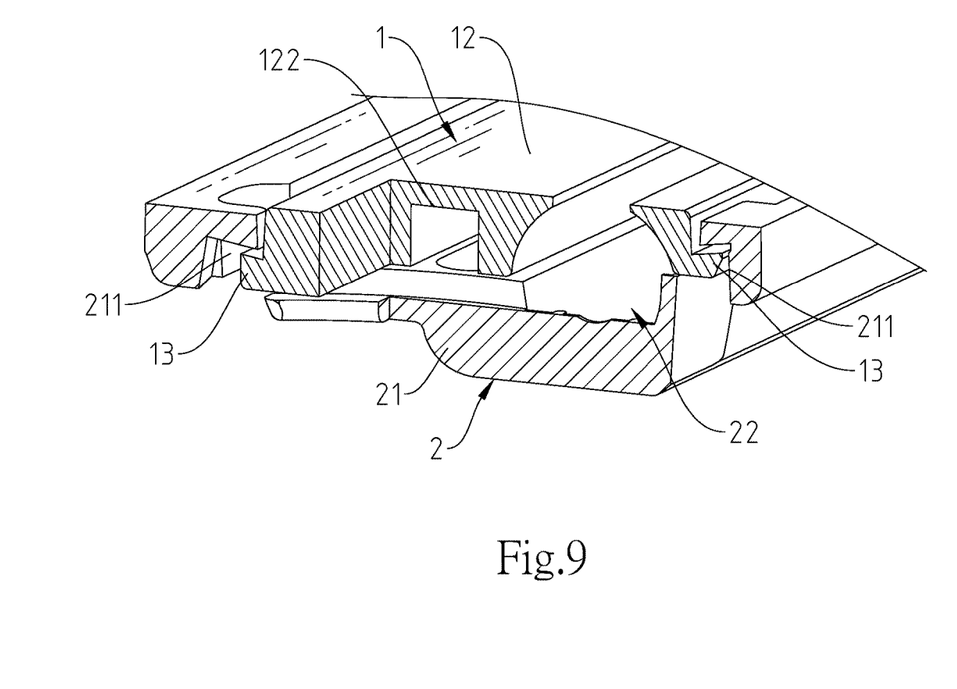
FIG. 9 is a sectional elevation of a part of the slide rail self-return mechanism in accordance with the present invention.

Referring to FIG. 3, FIG. 4 and FIGS. 6-9, from FIGS. 6-8, when assembling the holder base 1 and the sliding seat 2, place the holder base 1 at one side relative to the sliding seat 2, and then move the holder base 1 and the sliding seat 2 toward each other for letting the sliding rails 13 of the holder base 1 be respectively inserted into the respective displacement grooves 211 of the sliding seat 2 (see FIG. 9). When moving the holder base 1 and the sliding seat 2 toward each other, the position-limiting block 32 of the biasing member 3 will be forced through the insertion hole 123 into the mounting groove 122 and then moved along the front sloping guide surface 141 over the stop block 14 into the sliding groove 121. As soon as the position-limiting block 32 entered the sliding groove 121, the position-limiting block 32 is prohibited from transverse displacement relative to the sliding groove 121 and can simply be moved along the length of the sliding groove 121. When the biasing member 3 is being biased, the position-limiting block 32 will be moved into the notch 124. Further, when the holder base 1 and the sliding seat 2 are moved toward each other, the reciprocating rod 42 of the buffer device 4 will be engaged in between the two locating plates 15 of the holder base 1 and then positioned in position, allowing the reciprocating rod 42 to be moved in or out of the cylinder body 41 upon relative sliding movement between the holder base 1 and the sliding seat 2.

Referring to FIGS. 2 and 3 again, as illustrated, the base block 11 of the holder base 1 comprises two first connection grooves 111 respectively disposed at two opposite lateral sides relative to the guide plate 12; the sliding seat 2 further comprises two second connection grooves 212 respectively disposed at two opposite lateral sides relative to the sliding rails 21 and respectively aimed at the first connection grooves 111; two spring members 5 are respectively connected between the first connection grooves 111 and the second connection grooves 212.

What is claimed is:

1. A slide rail self-return mechanism, comprising:

a holder base comprising a base block, a guide plate extending from one side of said base block, two sliding rails longitudinally extending along two opposite lateral sides of said guide plate, a sliding groove longitudinally defined in said guide plate and abutted to said base block, a mounting groove longitudinally forwardly extending from a front end of said sliding groove remote from said base block and disposed in communication with said sliding groove, an insertion hole located on a front end of said guide plate in communication with a front end of said mounting groove opposite to said sliding groove, and a stop block disposed between said sliding groove and said mounting groove and defining a front sloping guide surface that slopes downwardly forwardly into said mounting groove and a rear stop surface that is abutted to said front end of said sliding groove;

a sliding seat comprising two sliding rails respectively disposed at two opposite lateral sides thereof in a parallel manner, an accommodation chamber defined therein between the two sliding rails of said sliding seat, and two displacement grooves respectively defined in the sliding rails of said sliding seat to face toward said accommodation chamber and respectively coupled with the sliding rails of said holder base for allowing said sliding seat to slide on said holder base; and a biasing member comprising a body pivotally mounted in said accommodation chamber of said sliding seat, and a position-limiting block located at said body and mounted in said sliding groove of said holder base.

2. The slide rail self-return mechanism as claimed in claim 1, wherein said base block of said holder base comprises two first connection grooves respectively disposed at two opposite lateral sides relative to said guide plate; said sliding seat further comprises two second connection grooves respectively disposed at two opposite lateral sides relative to the sliding rails thereof and respectively aligned with said first connection grooves; the slide rail self-return mechanism further comprises two spring members respectively connected between said first connection grooves and said second connection grooves.

3. The slide rail self-return mechanism as claimed in claim 1, wherein said holder base further comprises a notch located in one side wall of said sliding groove for receiving said position-limiting block upon biasing of said biasing member.

4. The slide rail self-return mechanism as claimed in claim 1, further comprising a buffer device accommodated in said accommodation chamber of said sliding seat, said buffer device comprising a cylinder body accommodated in said accommodation chamber of said sliding seat between the two sliding rails of said sliding seat, and a reciprocating rod connected to two locating plates at said holder base and movable in and out of said cylinder body.

* * * * *